United States Patent
Moris et al.

(10) Patent No.: US 6,561,549 B1
(45) Date of Patent: May 13, 2003

(54) SEALING CONNECTOR WITH VARIABLE GEOMETRY

(75) Inventors: Claude Moris, Albertville (FR); Damien Moris, Albertville (FR); Christophe Moris, Albertville (FR)

(73) Assignee: MDC SARL, Frontenex (FR)

( * ) Notice: Subject to any disclaimer, the term of this patent is extended or adjusted under 35 U.S.C. 154(b) by 0 days.

(21) Appl. No.: 09/786,467

(22) PCT Filed: Sep. 10, 1999

(86) PCT No.: PCT/FR99/02153
§ 371 (c)(1),
(2), (4) Date: May 16, 2001

(87) PCT Pub. No.: WO00/16000
PCT Pub. Date: Mar. 23, 2000

(30) Foreign Application Priority Data

Oct. 9, 1998 (FR) .............................. 98 11451

(51) Int. Cl.⁷ ........................... F16L 41/00; F16L 43/00
(52) U.S. Cl. .................. 285/184; 285/181; 285/272; 285/276
(58) Field of Search ................. 285/184, 181, 285/272, 276

(56) References Cited

U.S. PATENT DOCUMENTS

| | | | | |
|---|---|---|---|---|
| 24,834 A | * | 7/1859 | Tupper | 285/184 |
| 83,401 A | * | 10/1868 | Morrison | 285/184 |
| 132,604 A | * | 10/1872 | Smith et al. | 285/184 |
| 327,877 A | * | 10/1885 | Hodges | 285/184 |
| 783,987 A | * | 2/1905 | Walsh | 285/184 |
| 954,504 A | * | 4/1910 | Drew | 285/184 |
| 1,020,839 A | * | 3/1912 | Niesen | 285/184 |
| 1,125,642 A | * | 1/1915 | Blanchard | 285/184 |
| 1,285,849 A | * | 11/1918 | Walling | 285/184 |
| 1,605,507 A | * | 11/1926 | Burke | 285/184 |
| 1,880,098 A | * | 9/1932 | Mair | 285/184 |
| 2,124,474 A | * | 7/1938 | Scholtes | 285/184 |
| 2,178,240 A | * | 10/1939 | Pascale | 285/184 |
| 2,188,069 A | * | 1/1940 | Walsh | 285/184 |
| 2,203,088 A | * | 6/1940 | Hansson | 285/7 |
| 2,447,947 A | * | 8/1948 | Larson et al. | 285/184 |
| 2,479,580 A | * | 8/1949 | Marco | 285/184 |
| 2,581,047 A | * | 1/1952 | Salmond | 285/184 |
| 2,933,891 A | * | 4/1960 | Britt | 285/184 |
| 3,376,053 A | | 4/1968 | Novakovich et al. | |
| 5,064,226 A | * | 11/1991 | Klas | 285/184 |
| 5,549,634 A | * | 8/1996 | Scott et al. | 285/184 |
| 5,927,758 A | * | 7/1999 | Carlsson | 285/184 |
| 6,257,505 B1 | * | 7/2001 | Wang | 239/526 |

FOREIGN PATENT DOCUMENTS

| | | | |
|---|---|---|---|
| DE | 1750202 | 1/1971 | |
| EP | 0119782 | 9/1984 | |
| FR | 902066 | 8/1945 | |
| JP | 4-266687 | * 9/1992 | 285/184 |
| WO | 92/19901 | * 11/1992 | 285/184 |
| WO | 9719286 | 5/1997 | |
| WO | 9724549 | 7/1997 | |

* cited by examiner

*Primary Examiner*—Eric K. Nicholson
(74) *Attorney, Agent, or Firm*—Dowell & Dowell, P.C.

(57) ABSTRACT

The invention concerns a sealing connector with variable geometry, comprising two hollow elements (2, 3) having respectively a truncated surface (22, 32) inclined at an angle (α) relative to the generator (23, 33) of the element, each truncated surface (22, 32) has a circular and planar contact surface to enable the elements (2, 3) to be assembled by fixing means such that the generators (22, 23) of each element are assembled in one single point of intersection (C) so that the connection (1) may present two different angular positions when one of the two elements rotates.

11 Claims, 16 Drawing Sheets

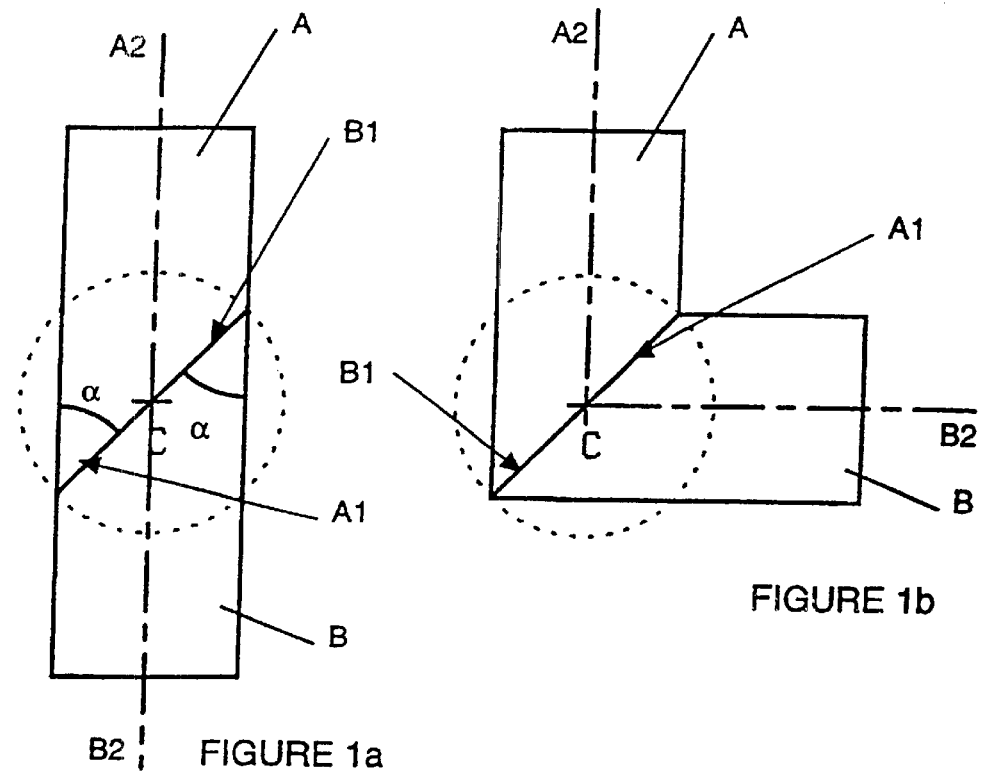
FIGURE 1a
FIGURE 1b
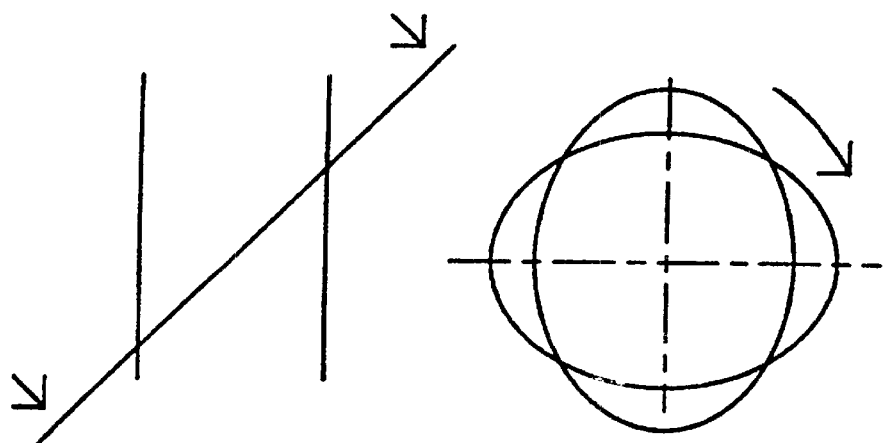
FIGURE 1c
FIGURE 1d

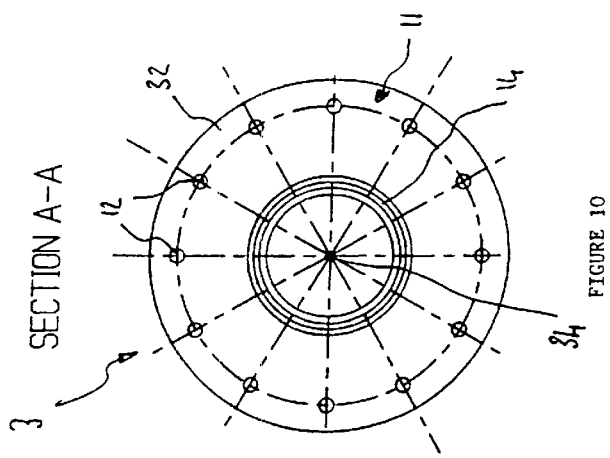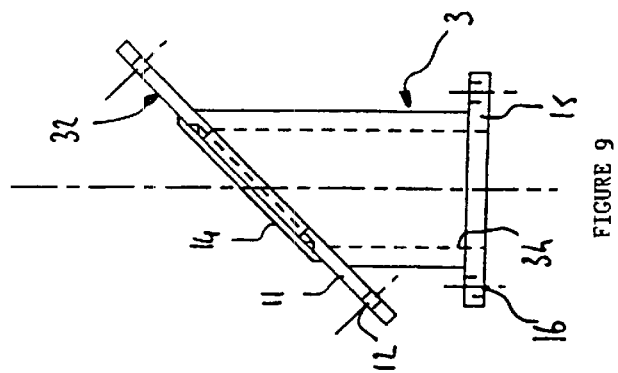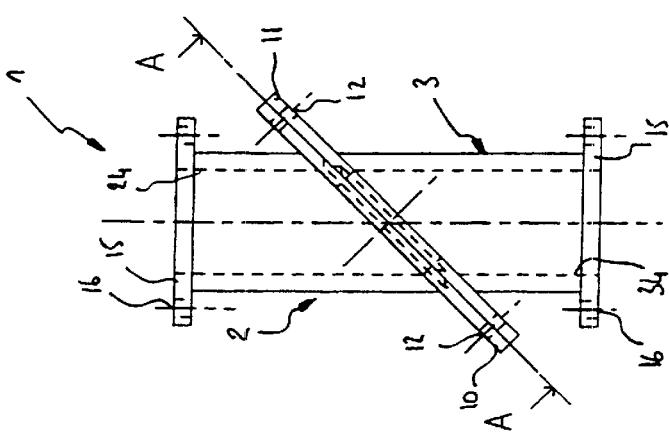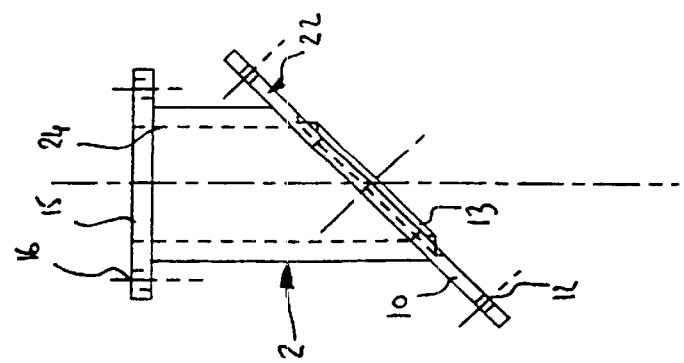

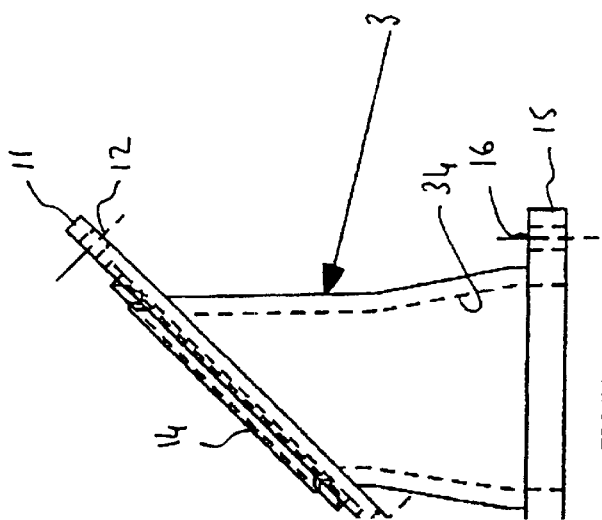
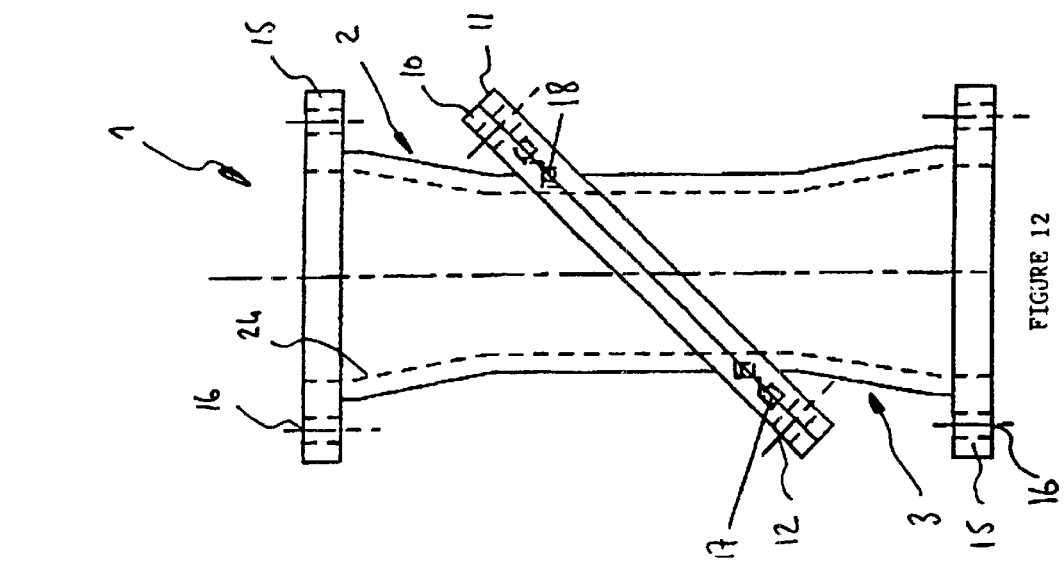
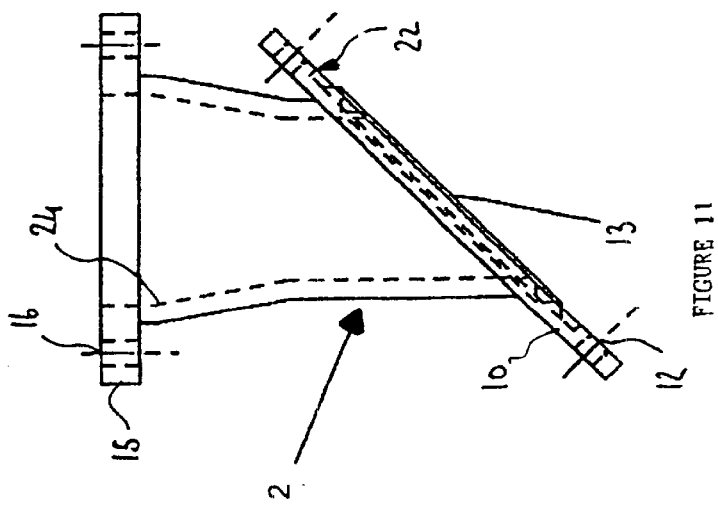
FIGURE 11
FIGURE 12
FIGURE 13

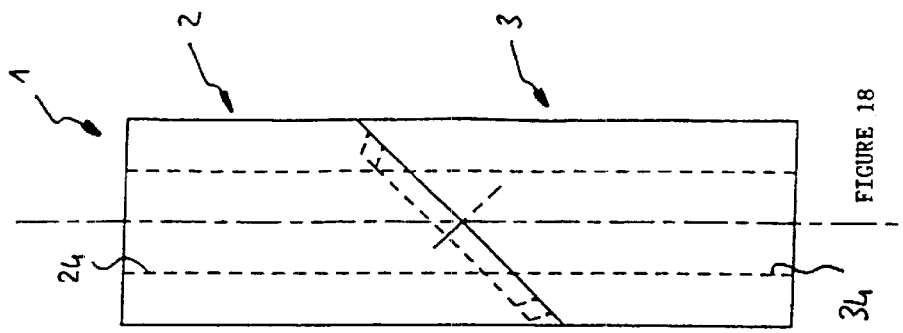
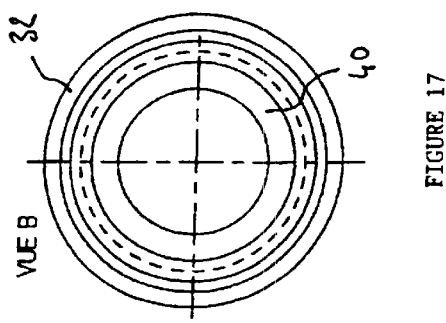
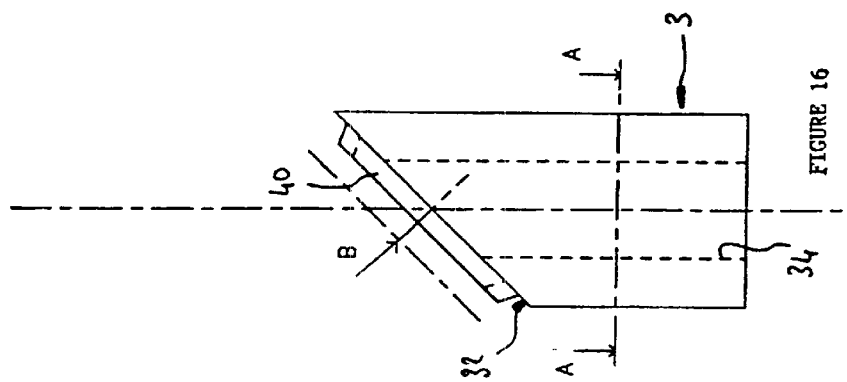
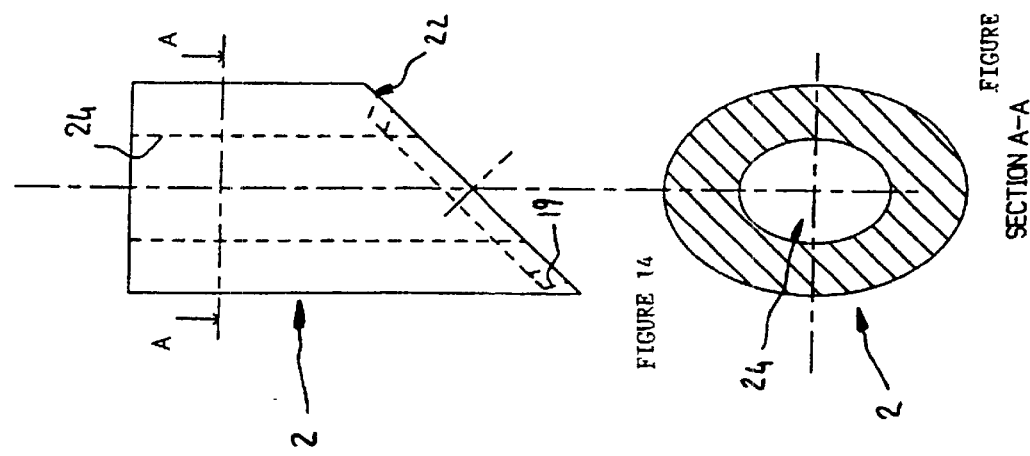

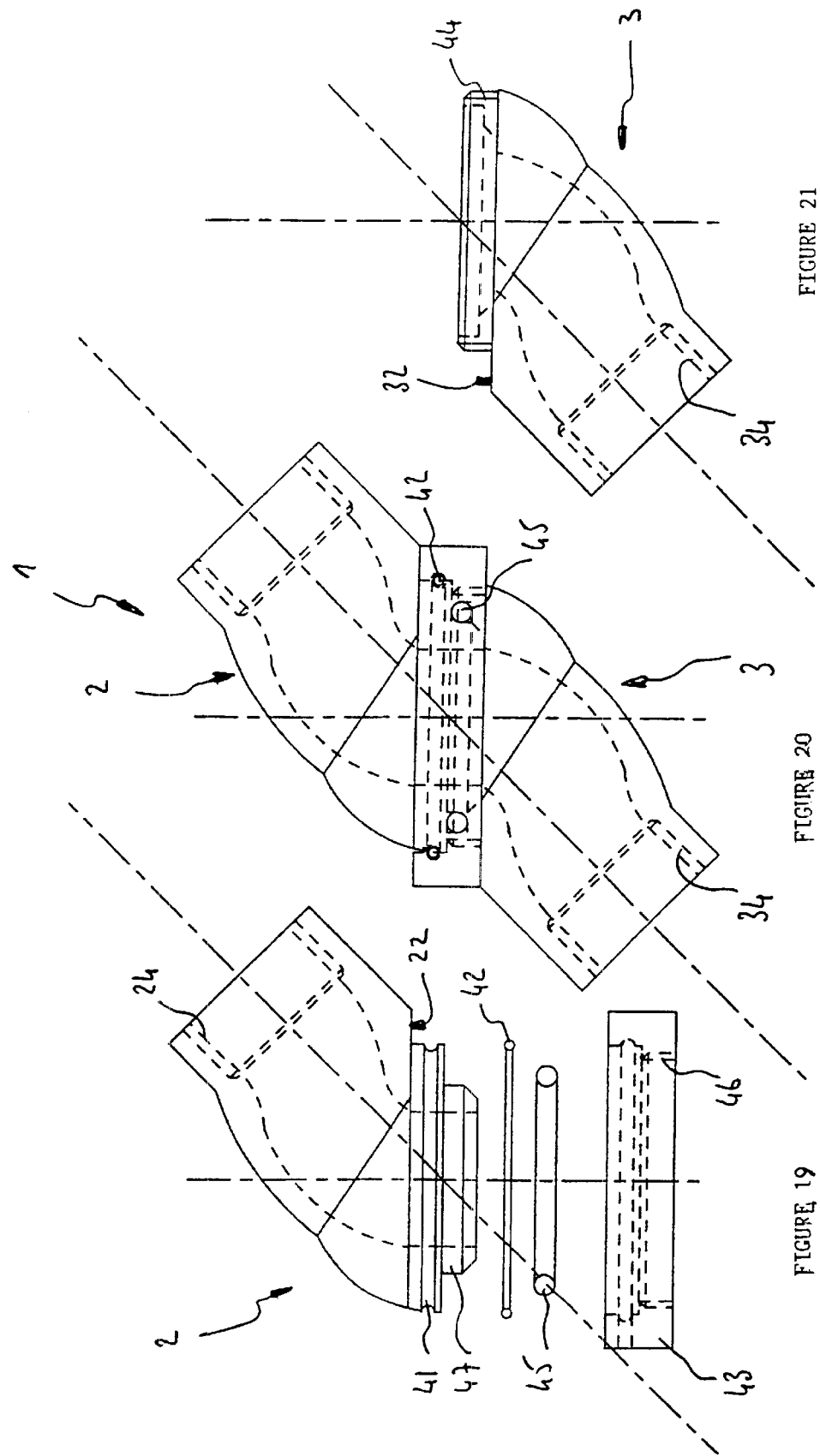

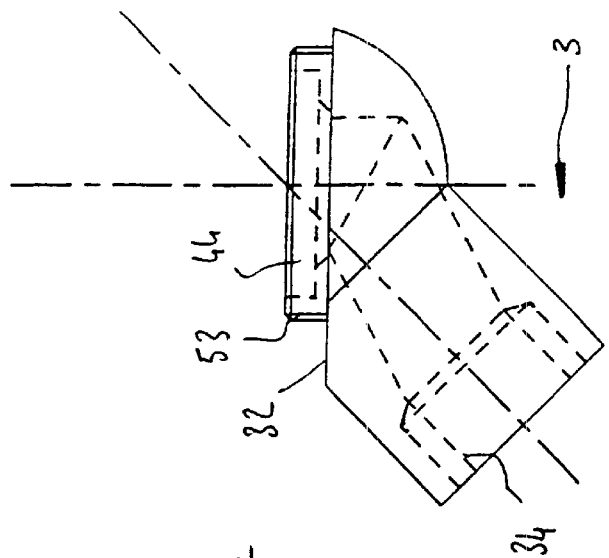
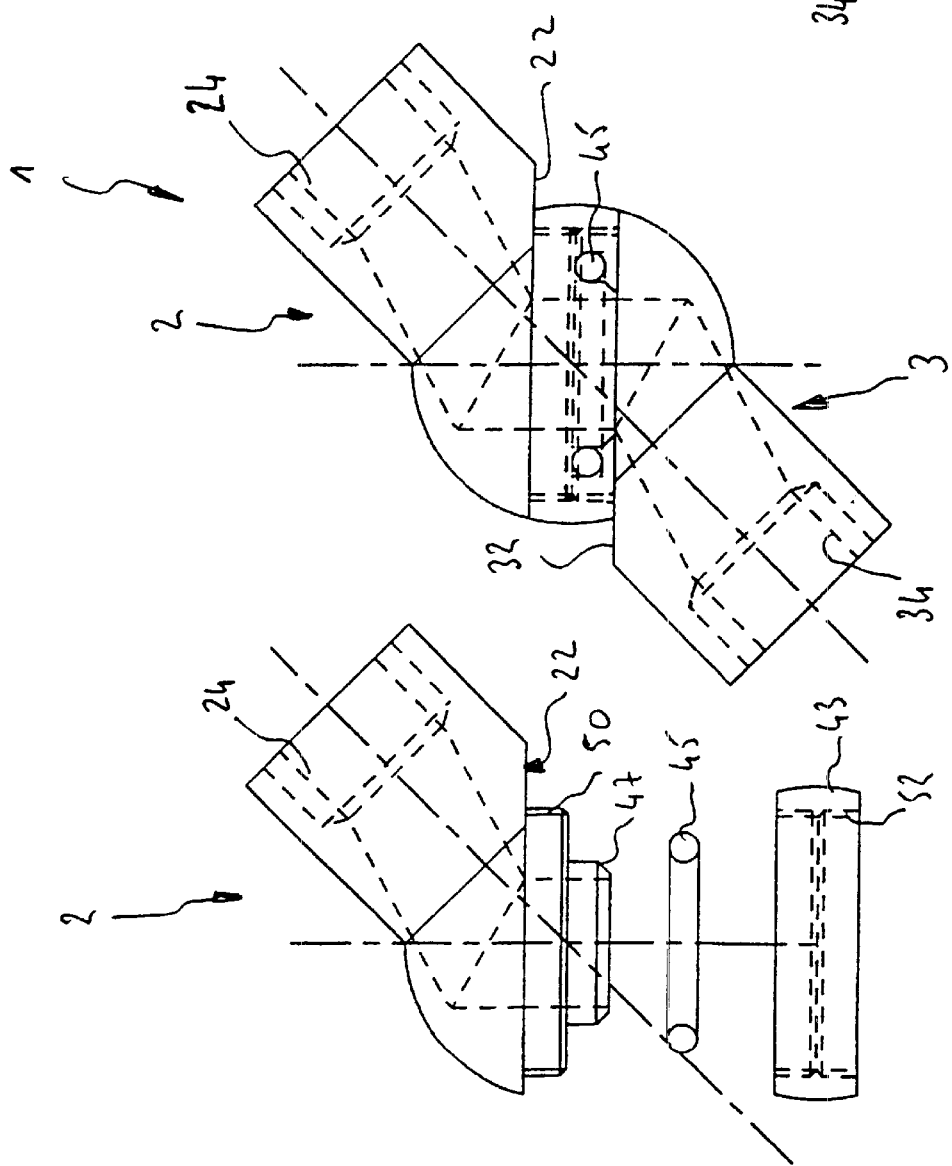
FIGURE 27
FIGURE 26
FIGURE 25

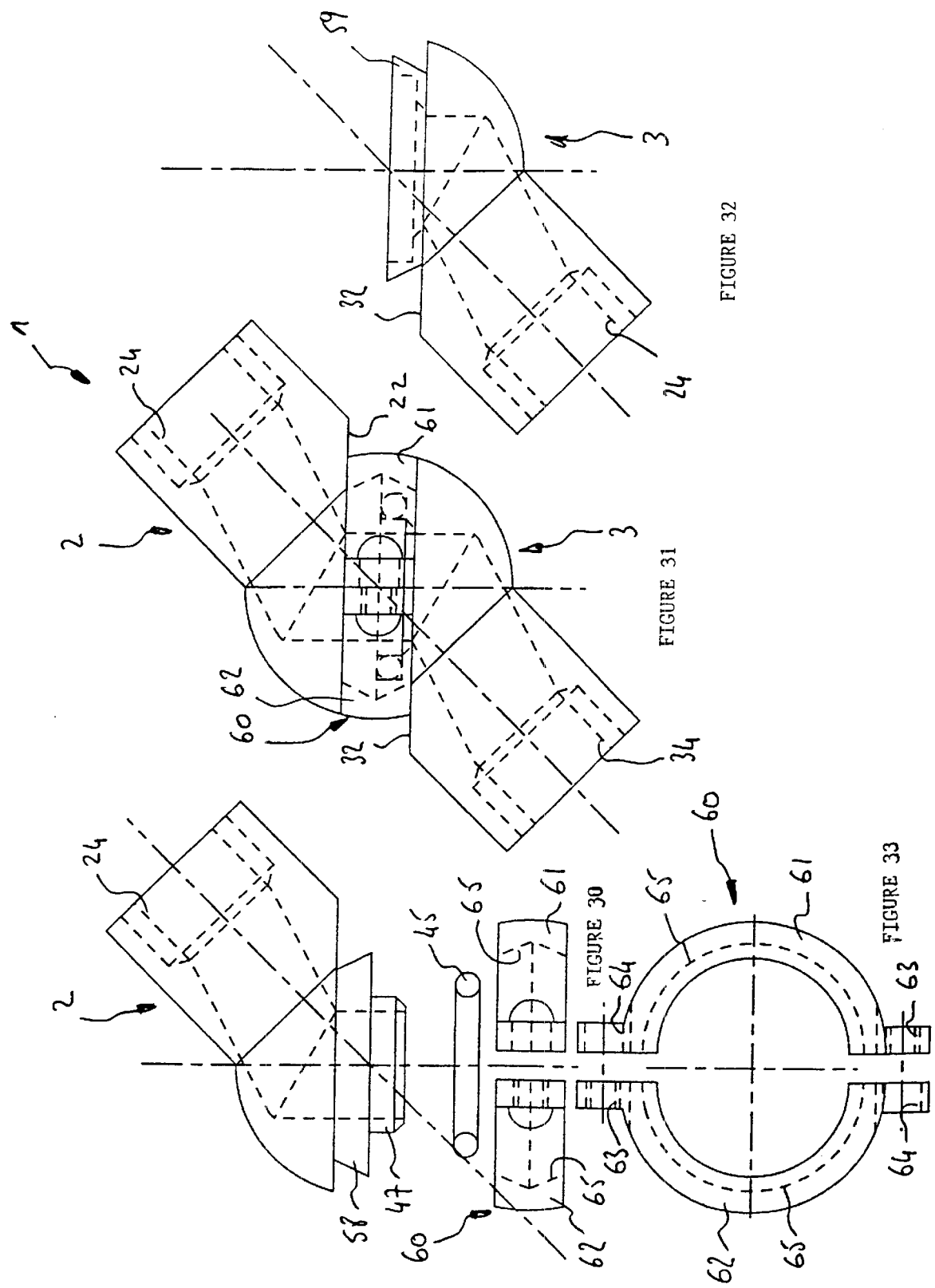

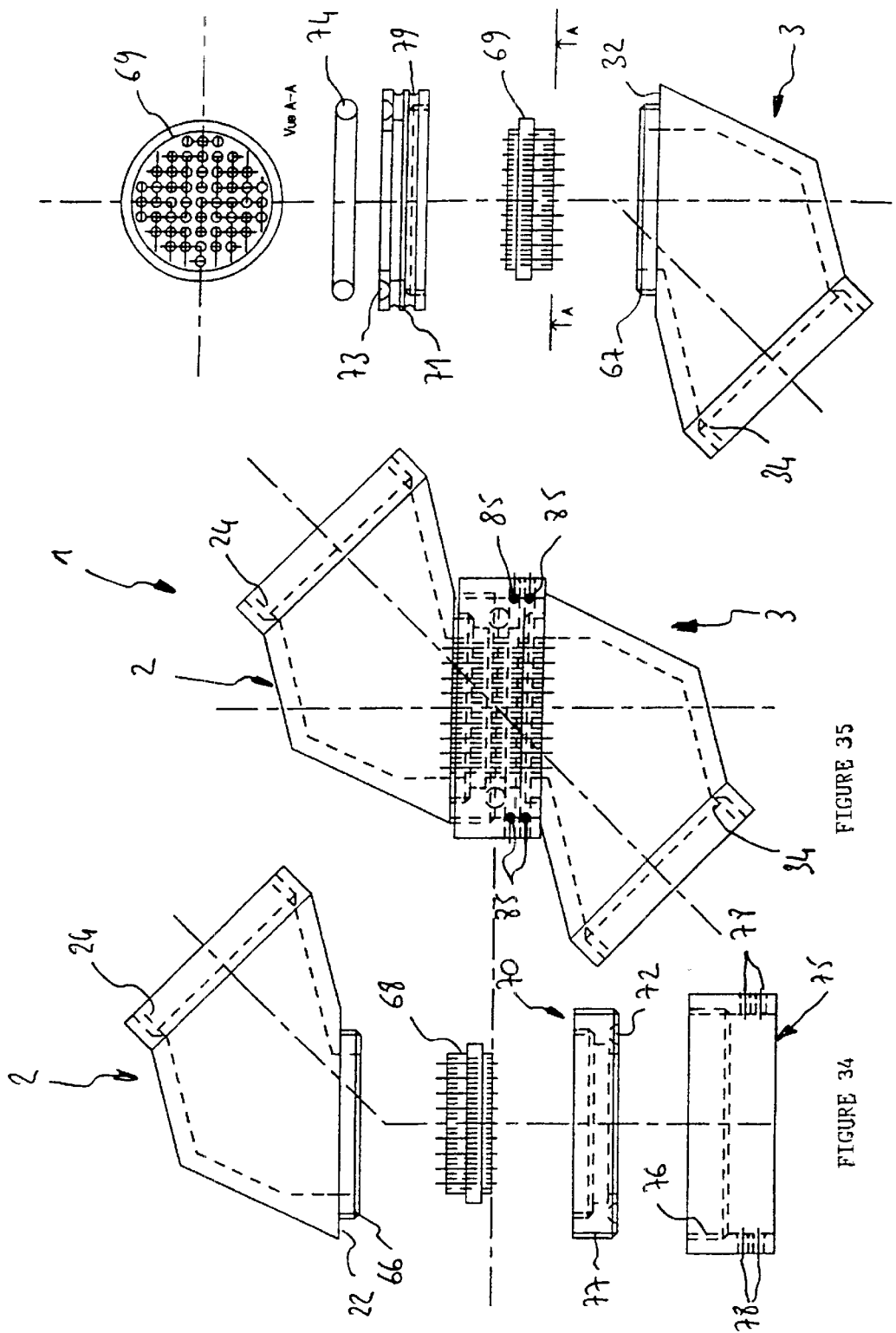

SEALING CONNECTOR WITH VARIABLE GEOMETRY

BACKGROUND OF THE INVENTION

Field of the Invention

The present invention relates to a variable geometry sealed coupling capable of adopting an infinite number of angular positions so that it can be tailored to best suit the environment in which it is used.

Brief Description of the Related Art

Couplings of this kind which generally have elements assembled together to form a swivel connection making it possible to obtain various angular positions in space are known.

It is found that this type of swivel coupling exhibits drawbacks as regards, on the one hand, the control of the seal between the elements, which is unable to allow high hydraulic throughputs to be obtained and, on the other hand, as regards the passing of electrical cables or the like.

Patent application WO 97/24549 discloses a sealed coupling comprising a main pipe provided with two inlets and an outlet, at least one of the inlets of which is designed to take a sleeve capable of pivoting with respect to the main axis of the pipe into various angular positions.

It is noted that one of the inlets of the main pipe has a truncated face which has a generator, whereas the coupling mounted on this inlet also has a truncated face borne by another generator.

It is found that when the coupling is mounted on the inlet of the main pipe, that the generators of each truncated face do not intersect at a single point of intersection located at the center of the connection.

Furthermore, the coupling cannot be disassembled from the main pipe, and its angle of inclination is designed to position said sleeve in different planes with respect to the main pipe.

SUMMARY OF THE INVENTION

It is these drawbacks that the present invention intends most particularly to overcome.

The variable geometry sealed coupling according to the present invention is intended to allow its user, and depending on the application circumstances, to bring said coupling into different angular positions, namely either straight, or bent to varying degrees.

The sealed coupling according to the present invention relies on a novel principle which consists in using the particular geometric characteristics offered, for example, by two planes inclined at 45°, 60°, 30° degrees or some other angle, placed face to face.

The variable geometry sealed coupling according to the present invention comprises two hollow elements each having a respective truncated face which is inclined by an angle α with respect to the generator of the elements, so that said generators meet at a single point of intersection at the center of the connection between the two elements, and fixing means which allow the hollow elements to be coupled together in a sealed way and allow the hollow elements to pivot angularly on each other, one with respect to the other, to bring the coupling into different angular positions and to take said elements apart.

The variable geometry sealed coupling according to the present invention comprises two elements of identical overall shape.

The variable geometry sealed coupling according to the present invention comprises elements each of which comprises a cylindrical part extended by a portion of hemispherical profile allowing each truncated face to exhibit a contact surface which is circular and flat.

The variable geometry sealed coupling according to the present invention comprises elements each of which is pierced with an internal bore having, at the hemispherically profiled portion, an elbowed part which is arranged in a plane perpendicular to the plane containing the truncated face.

The variable geometry sealed coupling according to the present invention comprises elements, the cylindrical part of each of which comprises, on its outer face, a threaded rib intended to take a fixing ring.

The variable geometry sealed coupling according to the present invention comprises elements, the hemispherically profiled portion of each of which comprises, at the same end as the truncated face and outside of the elbowed part of the bore, a threaded profile designed to take a hollow and threaded connecting ring allowing the elements of the coupling to be connected together.

The variable geometry sealed coupling according to the present invention comprises truncated faces which are pierced with a circular groove designed to take an O-ring to seal the coupling between the two elements.

The variable geometry sealed coupling according to the present invention comprises screw threads respectively on the connecting ring and on each threaded profile, the pitch of which is short, thus making it possible, when the elements are assembled, for one to be pivoted with respect to the other without the risk of becoming detached so that the angular position of the coupling can be adjusted.

The variable geometry sealed coupling according to the present invention comprises elements of which the elbowed part of each bore comprises an internal screw thread intended to collaborate with a hollow and threaded connecting ring allowing said elements to be assembled together.

The variable geometry sealed coupling according to the present invention comprises screw threads respectively on the connecting ring and on the internal face of the elbowed parts of each bore, the pitch of which is short thus making it possible, when the elements are assembled, for one to be pivoted with respect to the other without the risk of becoming detached so that the angular position of the coupling can be adjusted.

The variable geometry sealed coupling according to the present invention comprises a first element, a hemispherically profiled portion of which comprises a flange provided with a truncated face inclined by the angle α, while the element is pierced on its truncated face with a peripheral groove intended to accommodate the flange for assembling the elements together.

The variable geometry sealed coupling according to the present invention comprises, between the two elements, an intermediate piece connected to each element by means of a connecting ring so that the coupling can be placed in a particular angular position.

The variable geometry sealed coupling according to the present invention comprises an intermediate piece which has a first truncated face which is inclined by an angle α with respect to the generator, a second truncated face inclined by the same angle α but in the opposite direction to that of the truncated face, and an open bore borne by the generator of said piece.

The variable geometry sealed coupling according to the present invention comprises an intermediate piece, the exterior profile of which allows each truncated face to present a contact surface which is circular and flat to allow independent rotation and angular adjustment of the elements with respect to said piece.

The variable geometry sealed coupling according to the present invention comprises fixing means which consist of disks pierced with a ring of holes to allow the elements to be assembled together.

The variable geometry sealed coupling according to the present invention comprises disks which respectively have a profile with double conicity accommodating a seal that ensures sealing when the elements are fixed together.

The variable geometry sealed coupling according to the present invention comprises fixing means which consist, when the elements are made of plastic, of a conical groove and of a conical rib of a shape that complements that of the groove.

The variable geometry sealed coupling according to the present invention comprises fixing means which consist:
  on the truncated face of the element of a continuation equipped with a circular groove intended to accommodate a wire made of metal so as to produce a pivoting connection to a fixing ring which, in its internal part, has a profile that complements that of the continuation,
  and on the truncated face of the element of a flange which is threaded on its external periphery so as to collaborate with the threaded internal part of the ring to allow the two elements to be fixed together and to rotate.

The variable geometry sealed coupling according to the present invention comprises a seal which is placed between the continuation of the element and the flange of the element, to guarantee perfect sealing when the coupling is assembled.

The variable geometry sealed coupling according to the present invention comprises fixing means which consist:
  on the truncated face of the element of a continuation equipped with a circular groove intended to accommodate a wire made of metal so as to produce a pivoting connection to a fixing ring which, in its internal part, has a profile that complements that of the continuation,
  and, on the truncated face of the element, of a flange equipped with a circular groove intended to accommodate another wire made of metal which collaborates with the complementary-shaped internal part of the ring to allow the two elements to be fixed together and to rotate.

The variable geometry sealed coupling according to the present invention comprises fixing means which consist:
  on the truncated face of the element, of a continuation equipped with a right-hand thread intended to collaborate with the internal screw thread of the fixing ring,
  and on the truncated face of the element, of a flange equipped with a screw thread which collaborates with the internal one of the fixing ring so that when the ring is screwed on, the two elements move toward one another, locking the connection.

The variable geometry sealed coupling according to the present invention comprises fixing means which consist:
  on the truncated face of the element, of a continuation equipped with a circular groove tucked at right angles with a housing to allow the passage of a ball provided in the element,
  and on the truncated face of the element, with an internal bore designed to accommodate the continuation of the element and the internal periphery of which has a housing for fitting the ball.

The variable geometry sealed coupling according to the present invention comprises fixing means which consist:
  on the truncated face of the element, of a continuation equipped with a conically profiled flange,
  on the truncated face of the element, of another conically profiled flange,
  and of a ring made up of two semi-collars comprising threaded and plain holes allowing the ring to join up around the conical flanges so as to produce a rotary connection capable of holding the elements together.

The variable geometry sealed coupling according to the present invention comprises fixing means which consist:
  on the truncated faces of the elements, of a threaded continuation into which pieces which act as supports for the male and female connector parts are introduced,
  of rings which respectively collaborate with the threaded continuations to hold the pieces, said rings each having a groove intended to house an O-ring when the elements are assembled so as to seal the connection,
  and of another ring allowing the rings to be joined together when the elements are assembled.

The variable geometry sealed coupling according to the present invention comprises a ring which has a tapped thread which collaborates with the external one of the first ring and lateral drillings which open into grooves formed at the periphery of the second ring.

The variable geometry sealed coupling according to the present invention comprises balls which are introduced into the grooves in the second ring to produce the rotary connection between the elements.

BRIEF DESCRIPTION OF THE DRAWINGS

The description which will follow with reference to the appended drawings, given by way of nonlimiting examples, will allow for a better understanding of the invention, of the characteristics it has and of the advantages it is likely to afford:

FIGS. 1a to 1d are schematic views illustrating the general principle that is the subject of the present invention.

FIGS. 7 to 13 are views depicting another embodiment of the variable geometry sealed coupling intended more particularly for the routing of heavy piping of the hydraulic, oil or gas network type.

FIGS. 14 to 18 are views showing another embodiment of the variable geometry sealed coupling intended more particularly for protecting electrical cables.

FIGS. 19 to 21 are views illustrating another embodiment of the variable geometry sealed coupling, in which the hollow elements have an internal bore of tortuous profile, but always guaranteeing the same cross section.

FIGS. 25 to 27 are views showing another embodiment of the variable geometry sealed coupling, in which the connection between the hollow elements is made using a fixing ring with a screw thread of the opposite hand.

FIGS. 30 to 33 are views depicting another embodiment of the variable geometry sealed coupling in which the connection between the hollow elements is made using a fixing ring consisting of two assembled parts.

FIGS. 34 to 39 are views depicting another embodiment of the variable geometry sealed coupling intended to be used in the field of electrical connections and, in particular, in the use of heavy duty rigid protecting trunking.

DESCRIPTION OF THE PREFERRED EMBODIMENTS

Figure 2A:
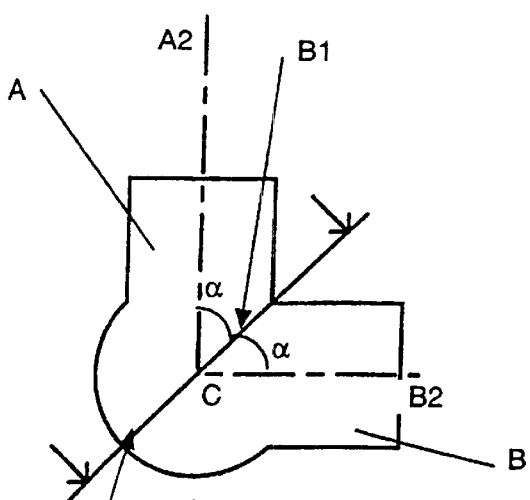
FIGS. 2a to 2f are schematic views depicting the genera principle to apply to the variable geometry sealed coupling according to the present invention.
Figure 2B:
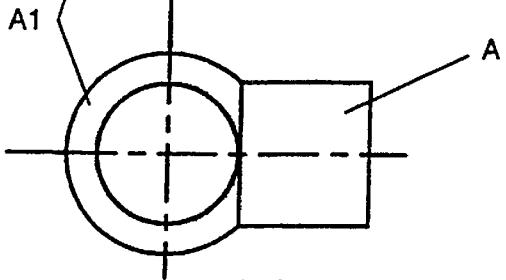

FIGS. 1a and 1b show the general principle that the sealed coupling 1 according to the present invention has to satisfy.

The general principle according to the invention consists in taking two cylindrical elements A and B having respectively, at each end, a truncated face A1 and B1 inclined by an angle α with respect to the generators or main axes A2 and B2 or with respect to the outer edge of each element.

In our example, the angle α is inclined by 45° degrees. This inclination may differ without in any way changing the subject of the invention.

Note that the cylindrical elements A and B have identical shapes which means that when they are assembled, the truncated faces A1 and B1 rest one against the other.

Furthermore, it may be seen that the generators A2 and B2 of each cylindrical element A and B always meet at one single point of intersection C contained in the contacting planes containing the truncated faces A1 and B1, and that this is true independently of the angular position of the two cylindrical elements one with respect to the other.

This particular arrangement of the cylindrical elements A and B makes it possible when one of the elements is rotated by half a turn about the point C, and in the plane containing the contacting truncated faces A1, B1, to obtain a variation in the angular position of the two cylindrical elements which is between 90° and 180° degrees for an angle α of 45° degrees.

It is also interesting to note that the principle also works with an angle α (other than 45° degrees, such as an angle of 30°, 60° or some other number of degrees, for example. This being the case, the variation in the angular position of the two cylindrical elements A and B is between 60° and 180° degrees.

It is also necessary to observe one last parameter which consists in the fact that the surface for contact between the truncated faces A1 and B1 has to have the shape of a disk so that the rotation of the two cylindrical elements A and B is perfect and smooth, as depicted in chain line in FIGS. 1a and 1b.

Indeed, it has been found that a simple cylinder, the truncated face of which is cut off at an angle of 45° degrees, or the like, has a surface which is of elliptical appearance. This being the case, as soon as one of the two cylinders is rotated with respect to the other, it is found that the resulting contact surface is no longer uniform, taking part of the cylinder outside this surface (FIGS. 1c, 1d).

To solve this problem, it is envisioned for the ends of each cylindrical element A and B to have a hemispherical profile, or a profile of a novel elliptical shape, as is depicted in FIGS. 2a to 2f.

For example, it is found that it is possible to make the surface of contact between the two cylindrical elements A and B circular by producing a cylinder with a so-called elliptical profile having, for its major diameter, the length L, and for its minor diameter, d. It is also necessary to satisfy $L = \sqrt{2} \cdot d$ when α=45°. The value of L varies as a function of the value of the angle α, namely $L = d/\sin\alpha$.

Figure 2C:
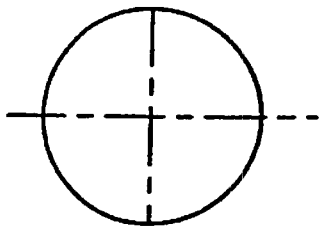
Figure 2D:
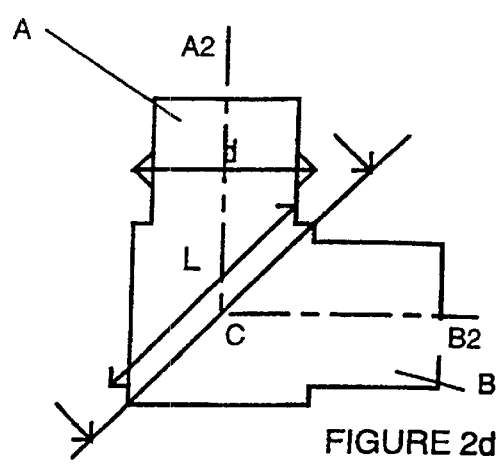
Figure 2E:
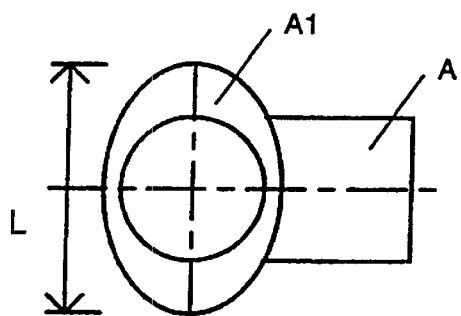
Figure 2F:
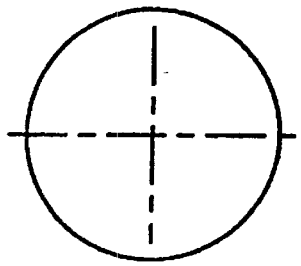

Thus, the truncated faces A1 and B1 are produced by cutting the end off the so-called elliptically profiled cylinder at the angle α equal, for example, to 45° degrees, so as to create the desired circular contact surface (FIGS. 2c and 2f).

Figure 3:
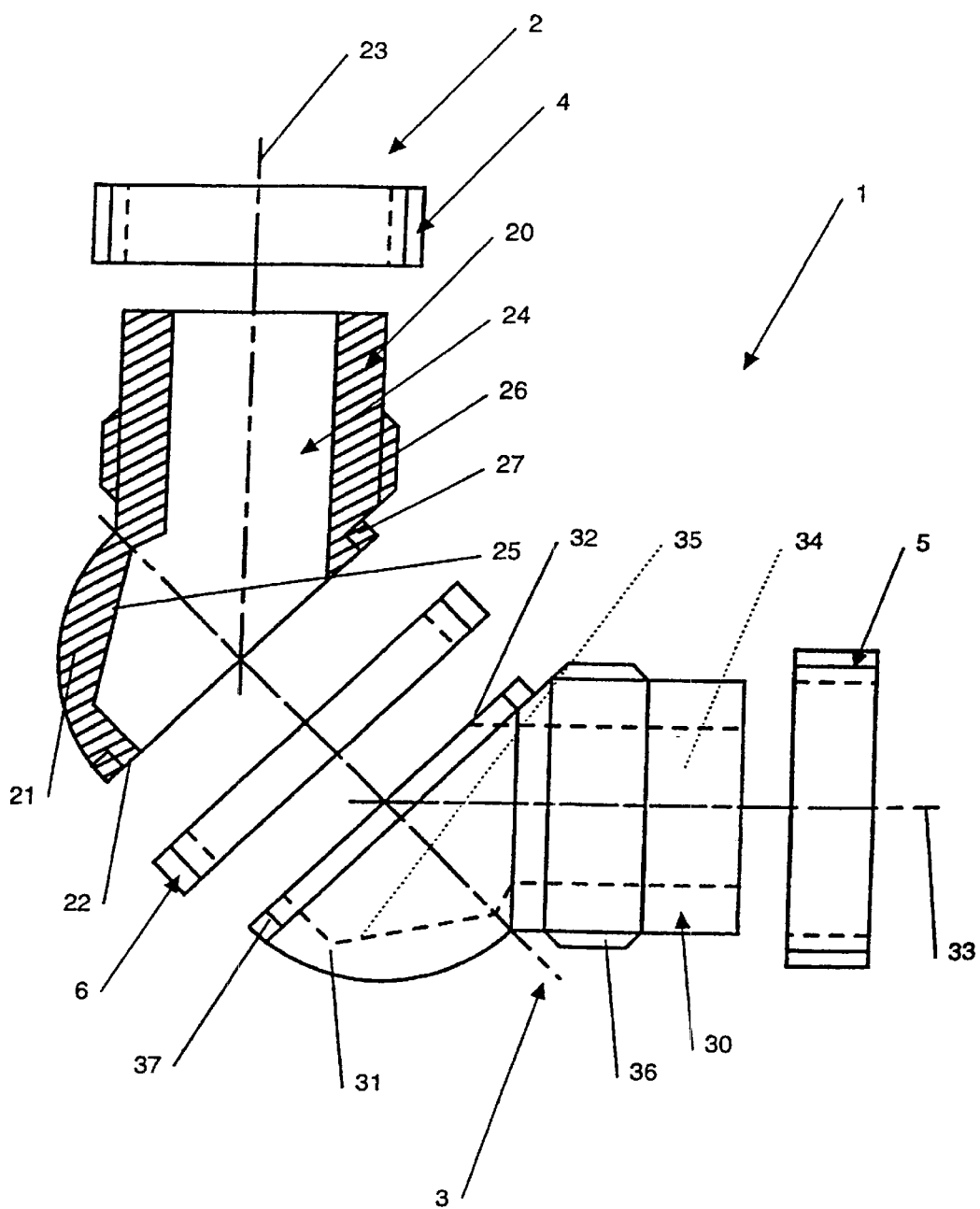
FIG. 3 is a view illustrating a first embodiment of the variable geometry sealed coupling according to the present invention.
Figure 4:
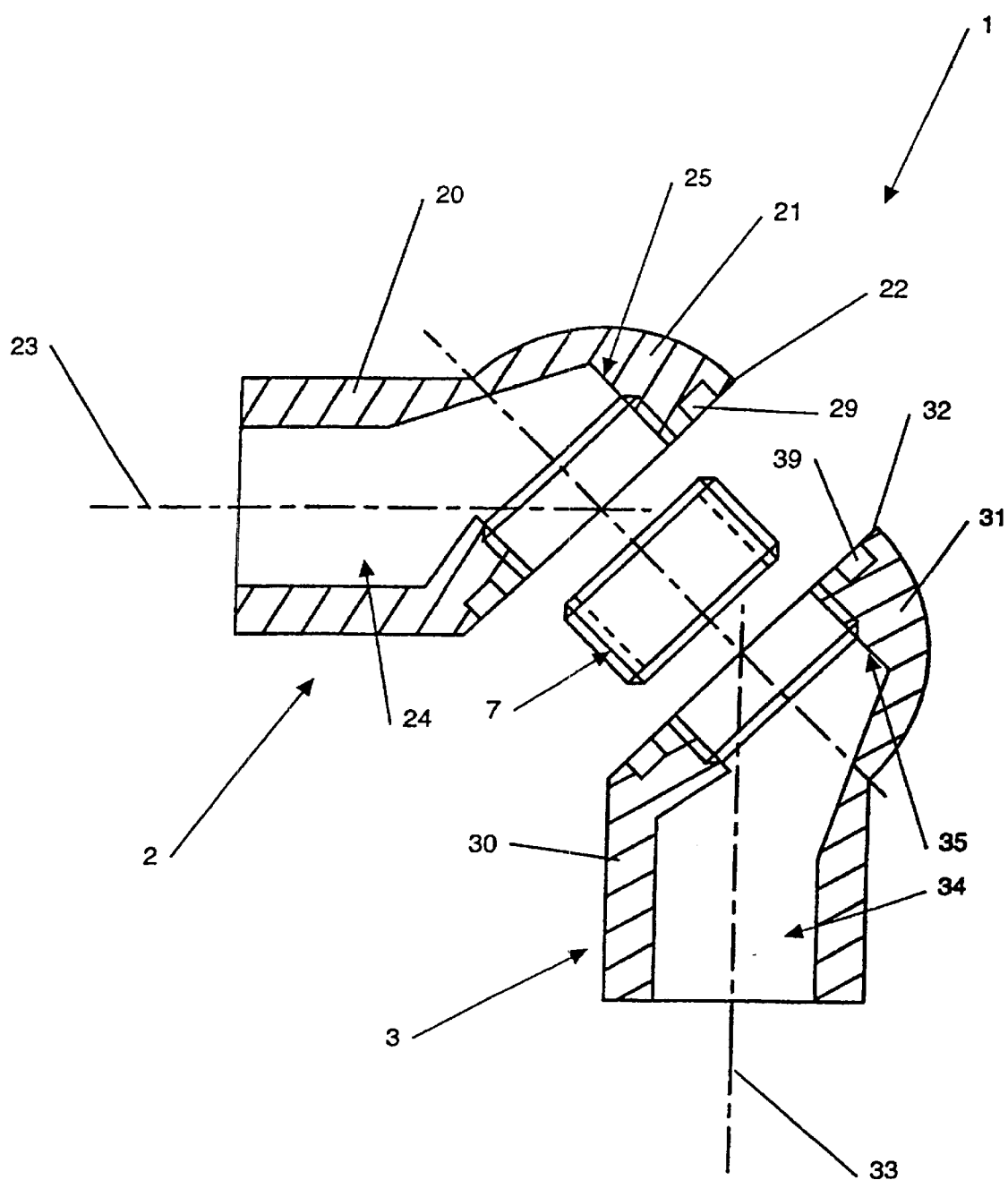
FIG. 4 is a view depicting a second embodiment of the variable geometry sealed coupling according to the present invention.
Figure 5:
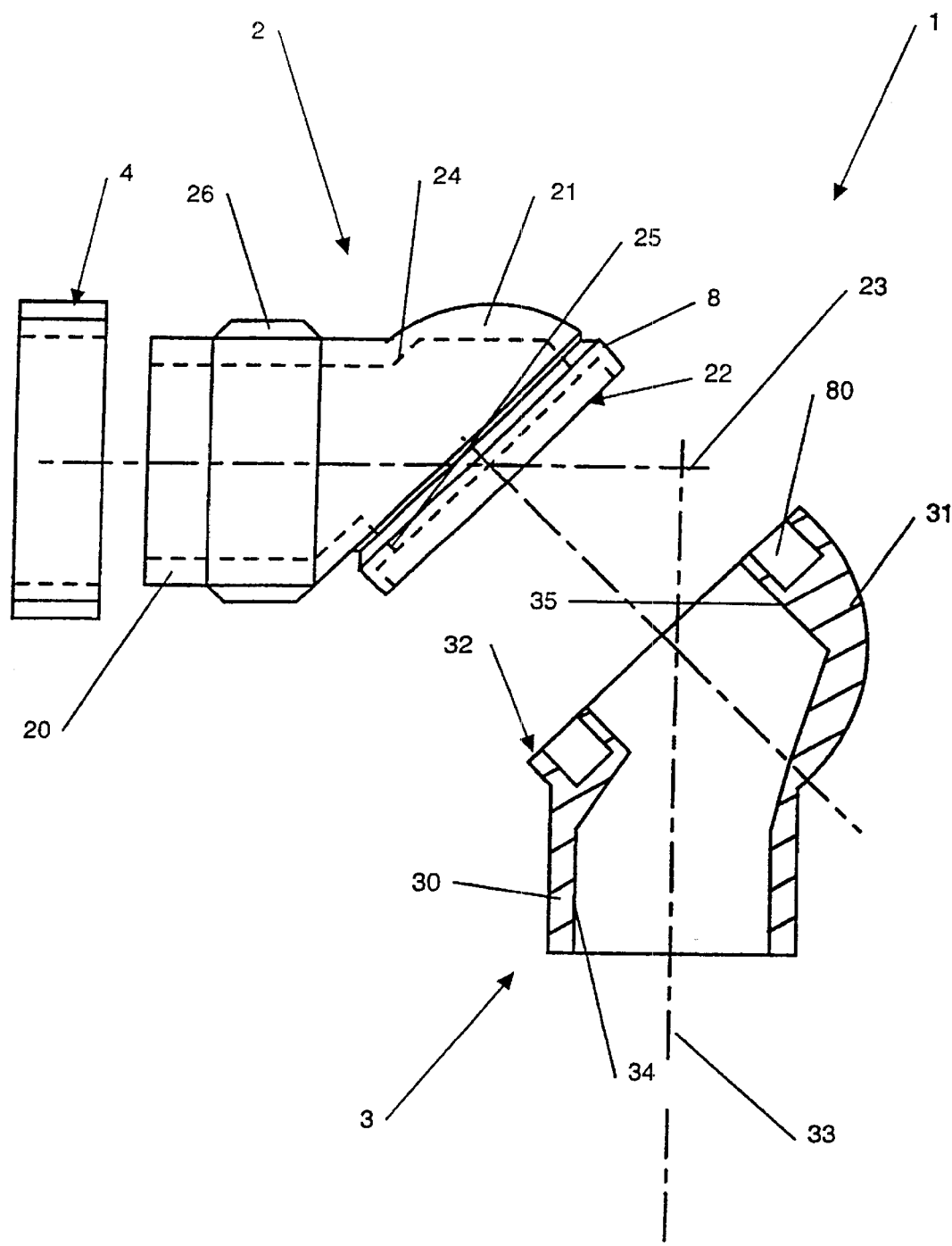
FIG. 5 is a view showing a third embodiment of the variable geometry sealed coupling according to the present invention.

With the general principle now explained, FIGS. 3 to 5 show various nonlimiting embodiments of the variable geometry sealed coupling 1 according to the present invention.

FIG. 3 depicts the sealed coupling 1 according to the invention comprising two hollow cylindrical elements 2 and 3 of identical shape. Each element comprises a cylindrical part 20, 30 extended by a portion 21, 31 of hemispherical external profile forming one end of said corresponding element.

Each portion 21, 31 has a truncated face 22, 32 which is inclined by an angle α with respect to the generator or main axis 23, 33 of the corresponding element 2, 3.

The cylindrical part 20, 30 is pierced with an internal bore 24, 34 which opens into the portion 21, 31 which has a hemispherical exterior profile.

The internal bore 24, 34 has, at the hemispherical portion 21, 31, an elbowed part 25, 35 which is located in a plane perpendicular to the one containing the truncated face 22, 32.

On its external face and near the portion 21, 31, the cylindrical part 20, 30 has a threaded rib 26, 36 intended to take a respective fixing ring 4, 5.

At the same end as the truncated face 22, 32, and outside the elbowed part 25, 35 of the bore 24, 34, the portion 21, 31 has a threaded profile 27, 37 designed to take a hollow connecting ring 6 allowing the two elements 2 and 3 to be assembled together and allowing said bores to communicate.

The hemispherical profile of each portion 21, 31 allows the truncated faces 22, 32 to have a contact surface which is circular and flat allowing the fitting, for example, of an O-ring, not depicted, to seal the coupling 1 and, more particularly, to provide sealing between the two elements 2 and 3.

The screw threads provided respectively on the connecting ring 6 and on the profiles 27, 37 have a very short pitch making it possible, when the two elements 2 and 3 are assembled, for one to be pivoted with respect to the other without the risk of becoming detached so that the angular position of the coupling 1 can be adjusted.

When the elements 2 and 3 are assembled and adjusted in terms of angular position, all that is required is for the rings 4 and 5 to be screwed on so that the elements 2 and 3 are locked in terms of rotation about the connecting ring 6 and rest thereon.

FIG. 4 shows the variable geometry sealed coupling 1 according to the invention slightly modified, particularly in the fixing means that allow the cylindrical elements 2 and 3 to be assembled and their angular position with respect to one another to be adjusted.

The elements 2 and 3 have a structure identical and similar to the one described earlier, namely that they respectively comprise a cylindrical part 20, 30 which is extended by a portion 21, 31 with a hemispherical exterior profile.

Each portion 21, 31 has a truncated face 22, 32 which is inclined by an angle α with respect to the generator 23, 33 of the corresponding element 2, 3.

The cylindrical part 20, 30 is pierced with an internal bore 24, 34 which opens into the portion 21, 31 with a hemispherical exterior profile.

The internal bore 24, 34 has, at the hemispherical portion 21, 31, an elbowed part 25, 35 which is arranged at right angles to the plane containing the truncated face 22, 32.

The elbowed part 25, 35 of the bore 24, 34 comprises, on its internal face, a screw thread intended to collaborate with a threaded and hollow connecting ring 7 allowing the elements 2 and 3 to be assembled together and allowing said bores to communicate.

Each truncated face 22, 23 has, depending on the exterior profile of the portions 21, 31, a contact surface 28, 38 which is circular and flat and in which is cut a circular groove 29, 39 allowing the fitting, for example, of an O-ring, not depicted, to seal the coupling 1 and more particularly to provide sealing between the two elements 2 and 3.

The screw threads provided respectively on the connecting ring 7 and on the internal face of the elbowed parts 25, 35 of the bore 24, 34 have a very short pitch making it possible, when the two elements 2 and 3 are assembled, for one to be able to be pivoted with respect to the other without the risk of becoming detached so that the angular position of the coupling 1 can be adjusted.

FIG. 5 illustrates the variable geometry sealed coupling 1 according to the invention slightly modified, more specifically in terms of the fixing means that allow the cylindrical elements 2 and 3 to be assembled and their angular position one with respect to the other to be adjusted.

The hemispherically profiled portion 21 of the element 2 comprises a flange 8 provided with the truncated face 22 which is offset with respect to the plane of intersection of the generators.

The element 3 is cut on its truncated face 32 with a peripheral groove 80 designed to collaborate with the flange 8 so that the elements 2 and 3 can be assembled by clinching them together. An O-ring may be provided at the connection between the elements 2 and 3, to guarantee that the coupling 1 is sealed.

When the elements 2 and 3 are assembled and adjusted in terms of angular position, all that is required is for the ring 4 provided on the element 2 to be screwed on, so that the elements 2 and 3 are locked in terms of rotation.

Figure 6:
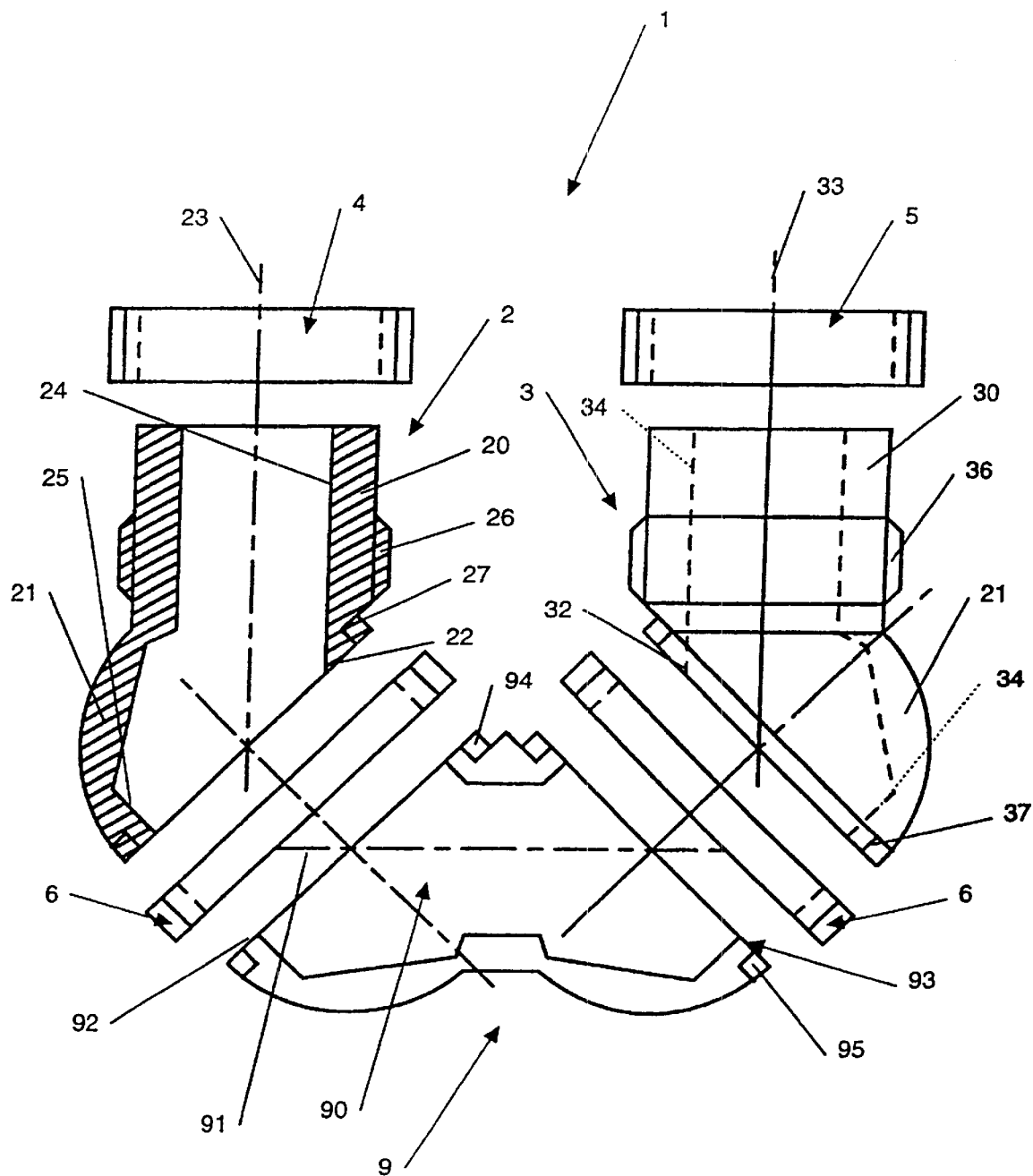
FIG. 6 is a view illustrating an accessory allowing elements to be connected so that the sealed coupling can be placed in a particular angular position.

FIG. 6 shows the variable geometry sealed coupling 1 according to the invention in a particular angular position capable of producing a total angle of 360°, which position is achieved by means of a piece 9 which is mounted between the elements 2 and 3.

Figure 39:
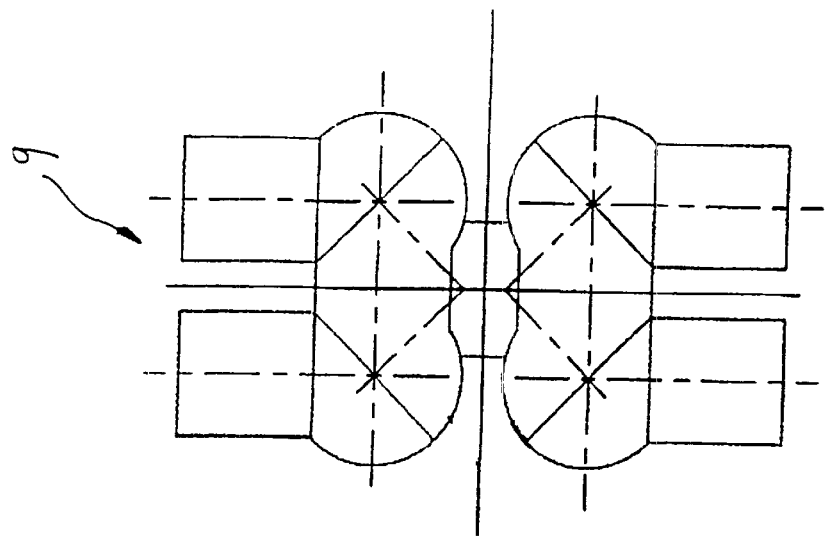
Figure 38:
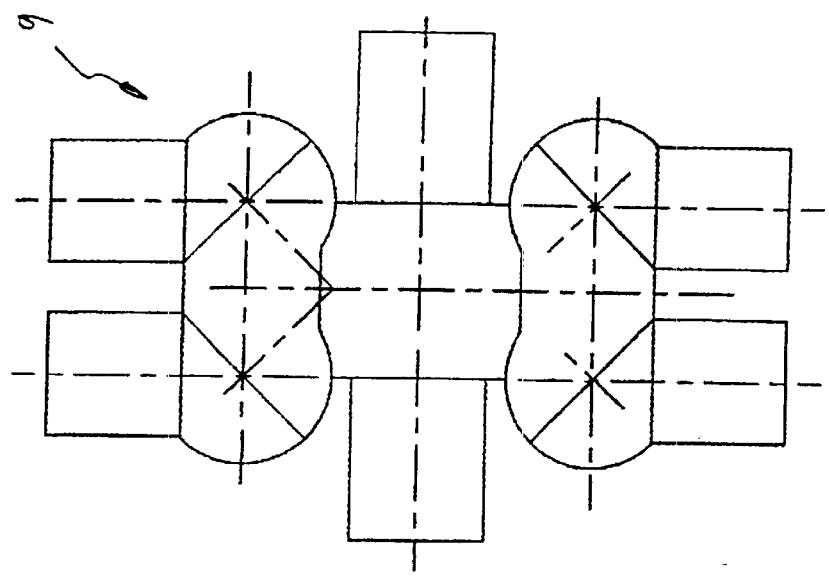
Figure 37:
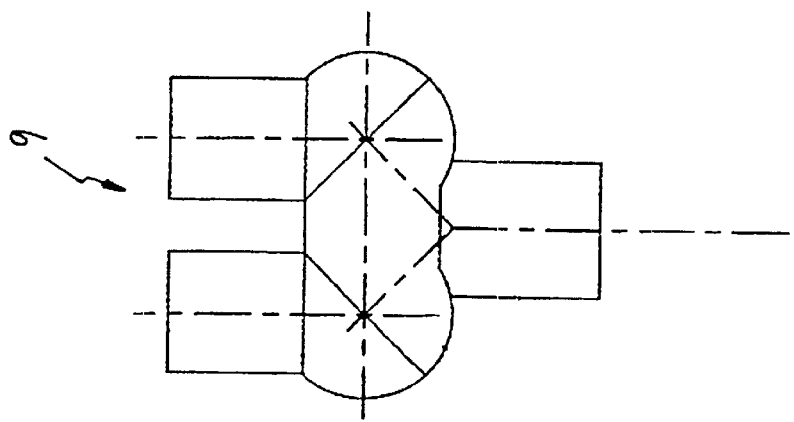

Using the same principle as was followed for the intermediate piece 9, pieces with overall connection characteristics in the shape of an H, Y or X can be produced, according to FIGS. 37 to 39.

The elements 2 and 3 have a shape identical and similar to that described in FIG. 3. Specifically, provision may be made for the assembly and fixing means to be similar to those described in FIG. 3, by means of the fixing rings 4 and 5 and of the connecting ring 6.

In this embodiment, the intermediate piece 9 is pierced with an internal bore 90 of which the generator, or main axis 91, is arranged at right angles to those 23, 32 of the elements 2, 3.

The intermediate piece 9 has a first truncated face 92 which is inclined by an angle α with respect to the generator 91 similar to the one envisioned for the inclination of the truncated face 22 of the element 2.

Thus, the two truncated faces 22 and 92 are arranged in two distinct and parallel planes allowing the element 2 to be assembled with the intermediate piece 9 by means of a first connecting ring 6 described previously.

On the opposite side to the truncated face 92, the intermediate piece 9 has another truncated face 93 which is inclined by the same angle α with respect to the generator 91 but in the opposite direction, that is to say in a plane intercepting the one containing the truncated face 92.

The intermediate piece 9 therefore has a second truncated face 93 which is inclined by an angle α with respect to the generator 91 similar to the one envisioned for the inclination of the truncated face 32 of the element 3.

Thus, the two truncated faces 32 and 93 are arranged in two distinct and parallel planes allowing the element 3 to be assembled with the intermediate piece 9 by means of a second connecting ring 6 described previously.

The truncated faces 92, 93 comprise, respectively, on the outside of the bore 90, a threaded profile 94, 95 each designed to take the corresponding hollow connecting ring 6 allowing the elements 2 and 3 to be assembled with the intermediate piece 9.

It may be seen that the exterior profile of the intermediate piece 9 allows the truncated faces 92, 93 to exhibit a contact surface which is circular so as to allow independent rotation and angular adjustment of the elements 2 and 3 with respect to the piece 9.

Each truncated face 92, 93, because of the exterior profile of the piece 9, has a contact surface which is circular and flat allowing the fitting, for example, of an O-ring, not depicted, to seal the coupling 1 and, more particularly, to provide sealing between the elements 2 and 3 and the intermediate piece 9.

The screw threads provided respectively on the connecting rings 6 at the elbowed parts 25, 35 of the elements 2, 3 and on the periphery of the truncated faces 92, 93 of the intermediate piece 9 have a very short pitch making it possible, when the two elements 2 and 3 are assembled on said piece 9 to pivot with respect to this piece without the risk of becoming detached so that the angular position of the coupling 1 can be adjusted.

When the elements 2 and 3 are assembled and adjusted in terms of angular position with respect to the intermediate piece 9, all that is required is for the rings 4 and 5 to be screwed on to lock the elements and the connecting rings 6 in terms of rotation by pressing thereon.

FIGS. 7 to 10 show the sealed coupling 1 according to the present invention comprising two elements 2, 3 of identical shape each provided with an internal bore 24, 34 opening on each side of said elements.

The elements 2, 3 have a respective truncated face 22, 32 delimited by a fixing disk 10 and 11 pierced with a ring of holes 12 allowing the elements to be assembled together.

Each disk 10 and 11 comprises at its center a profile with double conicity 13, 14 ensuring sealing when the elements 2, 3 are fixed together.

Opposite the disks 10 and 11 each element 2, 3 has a flange 15 pierced with holes 16 for connection to the pipes.

FIGS. 11 to 13 depict a variant form of the elements 2, 3 illustrated in FIGS. 7 to 10 and which are obtained more specifically by starting with a tube which is flattened to obtain an elliptical part. This elliptical part of each element 2, 3 is cut off at an angle α (to obtain a circular cross section.

The fixing disks 10 and 11 pierced with the ring of holes 12 to allow the elements 2, 3 to be assembled together are then welded on at the circular cross section.

The disks 10 and 11 respectively have a profile with double conicity 13, 14 accommodating a seal 17 providing sealing when the elements are fixed together. In addition, it is possible to envision another seal 18 which improves this sealing.

FIGS. 14 to 18 show the sealed coupling 1 according to the present invention comprising two identically shaped elements 2, 3 made of plastic and each equipped with an internal bore 24, 34 opening on each side of said elements.

The elements 2 and 3 have an elliptical exterior profile and an internal bore 24 and 34 also of elliptical shape.

The element 2 has a truncated face 22 in which a conical groove 19 is formed while the element 3 has a truncated face 32 secured to a conical rib 40 of a shape that complements that of the groove so that the two elements can be joined and fixed together.

FIGS. 19 to 21 illustrate the sealed coupling 1 according to the present invention comprising two hollow elements 2, 3 allowing, for example, the connection of pipes containing gas, liquid, cables or powder.

The hollow elements 2 and 3 are of a similar construction and have a respective internal bore 24, 34 with a complex profile and a respective truncated face 22, 32.

The truncated face 22 is secured to a continuation 47 equipped with a circular groove 41 intended to accommodate a wire 42 made of metal or some other material to produce a pivoting connection with a fixing ring 43 which, in its internal part, has a profile that complements that of the continuation.

The truncated face 32 is secured to a flange 44 which is threaded on its external periphery so as to collaborate with the threaded internal part 46 of the ring 43 to allow the two elements 2 and 3 to be fixed together.

A seal 45 is placed between the continuation of the element 2 and the flange 44 of the element 3 to guarantee a perfect seal when the coupling 1 is assembled.

Figure 24:
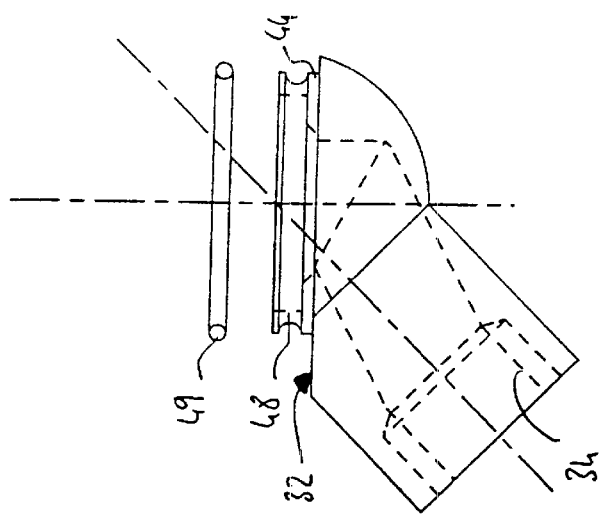
FIGS. 22 to 24 are views depicting another embodiment of the variable geometry sealed coupling, in which the connection between the hollow elements is made by a fixing ring and metal wires.
Figure 23:
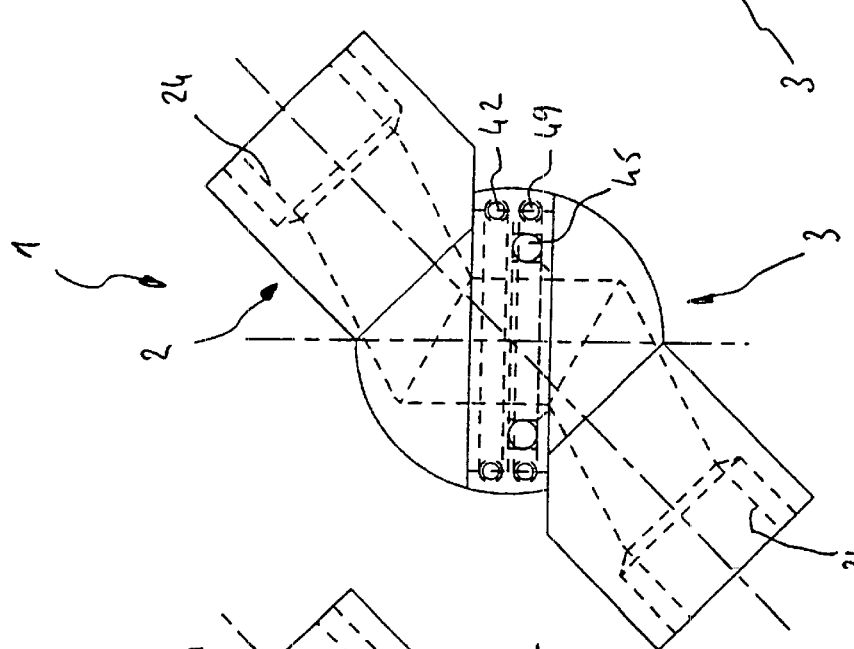
Figure 22:
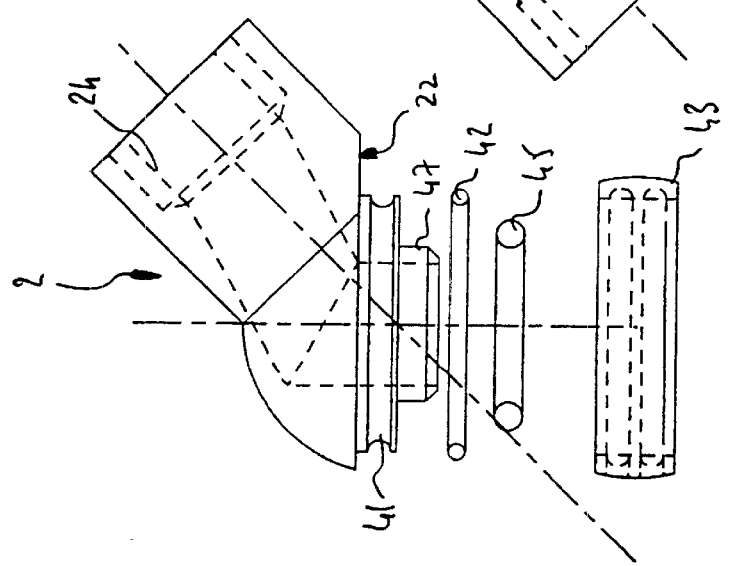

FIGS. 22 to 24 show the sealed coupling 1 according to the present invention comprising two hollow elements 2, 3 allowing, for example, the connecting of gas, liquid, cable or powder pipes.

The hollow elements 2 and 3 are of similar construction and have a respective internal bore 24, 34 of complex profile and a respective truncated face 22, 32.

The truncated face 22 is secured to a continuation 47 equipped with a circular groove 41 and intended to accommodate a wire 42 made of metal to produce a pivoting connection with a connecting ring 43 which, in its internal part, has a profile that complements that of the continuation.

The truncated face 32 is secured to a flange 44 equipped with a circular groove 48 intended to accommodate another metal wire 49 which collaborates with the complementary-shaped internal part of the ring 43 to allow the two elements 2 and 3 to be fixed together.

A seal 45 is placed between the continuation 47 of the element 2 and the flange 44 of the element 3 to guarantee a perfect seal when the coupling 1 is assembled.

FIGS. 25 to 27 depict the sealed coupling 1 according to the present invention comprising two hollow elements 2, 3 allowing, for example, the connecting of gas, liquid, cable and powder pipes.

The hollow elements 2 and 3 are of similar construction and have a respective internal bore 24, 34 of complex profile and a respective truncated face 22, 32.

The truncated face 22 is secured to a continuation 47 equipped with a right-handed screw thread 50 intended to collaborate with the internal screw thread 51 of the fixing ring 43. The ring 43 in its internal part and at the opposite end to the right-handed screw thread 51 has another, left-handed, screw thread 52 which collaborates with the screw thread 53 of the flange 44 secured to the truncated face 32 of the element 3.

Thus, when the ring 43 is screwed on, the two elements 2 and 3 are moved closer together, locking the connection. The directly contacting faces of the elements 2 and 3 may be equipped with an indexing system such as notching of the type marketed under the brand name WURK, or the like, so as to lock the parts in terms of rotation one with respect to the other.

A seal 45 is placed between the elements 2 and 3 to guarantee perfect sealing when the coupling 1 is assembled.

Figure 29:
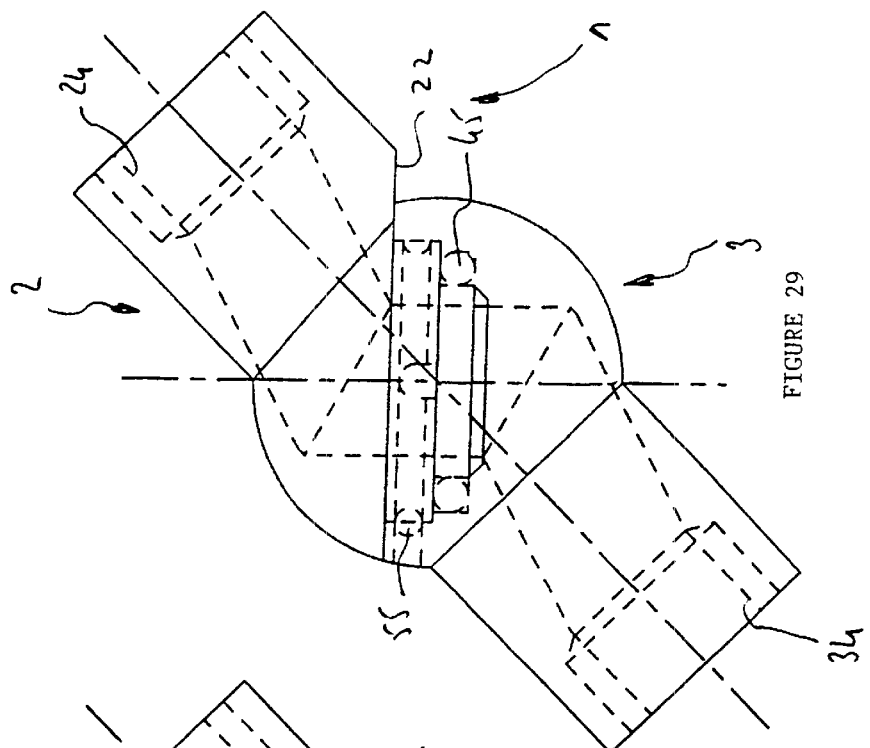
FIGS. 28 and 29 are views illustrating another embodiment of the variable geometry sealed coupling in which the connection between the hollow elements is made using a fixing ring and an indexing ball.
Figure 28:
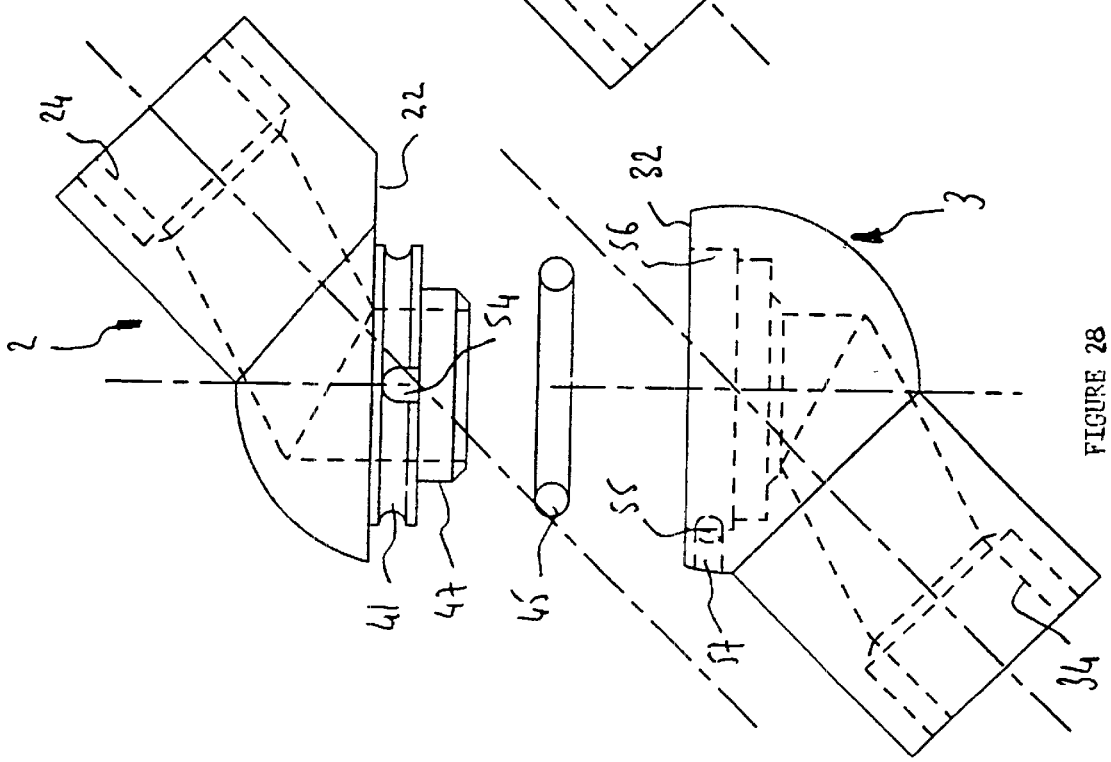

FIGS. 28 and 29 depict the sealed coupling 1 according to the present invention comprising two hollow elements 2, 3 allowing, for example, the connecting of gas, liquid, cable or powder pipes.

The hollow elements 2 and 3 are of similar construction and have a respective internal bore 24, 34 of complex profile and a respective truncated face 22, 32.

The truncated face 22 of the element 2 is secured to a continuation 47 equipped with a circular groove 41 cut at right angles with a housing 54 allowing the passage of a ball 55 provided in the element 3.

The truncated face 32 of the element 3 comprises an internal bore 56 designed to accommodate the continuation 47 of the element 2. The internal bore 56 on its periphery comprises a housing 57 for fitting the ball 55.

Thus, to connect the two elements 2 and 3 together, all that is required is for the ball 55 to be offered up to the housing 54 so that the two elements can be pushed together. Next, one of the two elements needs to be rotated to lock the connection, given that the ball 55 collaborates with the circular groove 41.

A seal 45 is placed between the elements 2 and 3 to guarantee a perfect seal when the coupling 1 is assembled.

It may be noted that the position of the ball 55 can be reversed and this ball may be located on the element 2 without in any way changing the subject of the connection between the two elements.

FIGS. 30 to 33 depict the sealed coupling 1 according to the present invention comprising two hollow elements 2, 3 allowing many uses.

The hollow elements 2 and 3 are of similar external shape and have a respective internal bore 24, 34 of complex profile and a respective truncated face 22, 32.

The truncated face 22 of the element 2 is secured to a continuation 47 equipped with a conically profiled flange 58, while the truncated face 32 of the element 3 is secured to another conically profiled flange 59.

The elements 2 and 3 are assembled with one another by means of a ring 60 made up of two semi-collars 61 and 62.

Each semi-collar 61 and 62 comprises threaded 63 and plain 64 holes allowing the ring 60 to be joined up.

Also, each semi-collar 61 and 62 has an internal bore 65 of conical profile in which the flanges 58, 59 collaborate when the elements 2 and 3 are assembled.

Thus, the ring 60 assembled around the flanges 58 and 59 makes it possible to produce a rotary connection capable of holding the elements 2 and 3 together. Finally, a seal 45 is placed between the elements 2 and 3 to guarantee perfect sealing when the coupling 1 is assembled.

FIGS. 34 to 36 depict the sealed coupling 1 according to the present invention comprising two hollow elements 2, 3 making it possible, for example, to connect rigid protective trunking in the field of electrical connections.

The hollow elements 2 and 3 are of identical exterior shape and have a respective internal bore 24, 34 of complex profile and a respective truncated face 22, 32.

The truncated faces 22 and 32 are secured to a respective threaded continuation 66 and 67 into which pieces 68 and 69 which act as supports for the male and female connector parts are introduced.

The pieces 68 and 69 are held on the elements 2 and 3 by means of rings 70 and 71 which collaborate respectively with the threaded continuations 66 and 67. The pieces 68, 66 and 69, 67 may be splined so as to orient and index the two parts of the coupling.

The rings 70 and 71 each comprise a groove 72 and 73 housing an O-ring 74 when the elements 2 and 3 are assembled so as to seal the connection.

The rings 70 and 71 are joined together when the elements 2 and 3 are assembled, using another ring 75.

The latter has a tapped thread 76 which collaborates with the external one 77 of the ring 70 and lateral drillings 78 which open into grooves 79 formed on the periphery of the ring 71.

Balls 85 are introduced into the grooves 79 and produce the rotary connection between the elements 2 and 3.

It may be noted that according to the means of assembly and of fixing of the elements 2, 3 of the coupling 1, the latter can always at least be split into two distinct parts at the truncated faces, thus making said coupling easier to fit and making it easier, for example, to pass electric cables or to connect these.

Note that depending on the plastics material used, that is to say a slightly rubbery plastic, the connection between the two elements 2 and 3 is sealed and disassemblable. Also, this kind of variable geometry sealed coupling may allow the passage of any liquid, gaseous or pulverulent fluid without any risk of leakage.

It must also be understood that the foregoing description has been given merely by way of example and that it does not in any way restrict the field of the invention, the scope of which would not be departed from if the execution details described were replaced by any other equivalent.

What is claimed is:

1. A variable geometry sealed coupling including two hollow elements (2, 3) each having a respective truncated face (22, 23) which is inclined by an angle with respect to a central axis (23, 33) of each element so that said central axes meet at a single point of intersection (C) at a center of the coupling, sealing and fixing means for coupling the hollow elements (2, 3) together in a sealed relationship with respect to one another while permitting the two hollow elements to be pivoted relative to one another to thereby change an angular relationship therebetween without changing a cross sectional dimension of a flow path through the two hollow elements; each hollow element (2, 3) including a cylindrical part (20, 30) extended by a portion (21, 31) of hemispherical profile such that each truncated face (22, 32) has a contact surface which is circular and flat; each hollow element (2, 3) having a bore (24, 34) and wherein the hemispherically profiled portion (21, 31) of each hollow element (2, 3) includes, adjacent the truncated face (22, 32) and outside the bore (24, 34), a threaded profile (27, 37) which is connected to a hollow and threaded connecting ring (6) which connects the two hollow elements (2, 3) together.

2. The variable geometry sealed coupling according to claim 1, wherein a pitch of screw threads provided respectively on the connecting ring (6) and on each threaded profile (27, 37) is short, so that the hollow elements (2, 3) can be adjusted without being separated.

3. A variable geometry sealed coupling including two hollow elements (2, 3) each having a respective truncated face (22, 23) which is inclined by an angle with respect to a central axis (23, 33) of each element so that said central axes meet at a single point of intersection (C) at a center of the coupling, sealing and fixing means for coupling the hollow elements (2, 3) together in a sealed relationship with respect to one another while permitting the two hollow elements to be pivoted relative to one another to thereby change an angular relationship therebetween without changing a cross sectional dimension of a flow path through the two hollow elements; the fixing means including disks (10, 11) each having a ring of holes (12); wherein each of the disks (10, 11) has a profile with double conicity (13, 14) which seat a seal (17) that ensures sealing during a rotation and coupling of the two hollow elements together.

4. A variable geometry sealed coupling including two hollow elements (2, 3) each having a respective truncated face (22, 23) which is inclined by an angle with respect to a central axis (23, 33) of each element so that said central axes meet at a single point of intersection (C) at a center of the coupling, sealing and fixing means for coupling the hollow elements (2, 3) together in a sealed relationship with respect to one another while permitting the two hollow elements to be pivoted relative to one another to thereby change an angular relationship therebetween without changing a cross sectional dimension of a flow path through the two hollow elements; the fixing means including on the truncated face (22) of the hollow element (2) a continuation (47) with a circular groove (41) which receives a bearing means (42) to create a pivoting connection with a fixing ring (43) which, in an internal part thereof, has a profile that complements that of the continuation, and on the truncated face (32) of the hollow element (3) a flange (44) which is threaded on an external periphery so as to engage with a threaded internal part (46) of the ring (43) to thereby couple the two hollow elements together.

5. The variable geometry sealed coupling according to claim 4, wherein a seal (45) is provided between the continuation (47) of the hollow element (2) and the flange (44) of the hollow element (3), to guarantee perfect sealing during the angular variation and when the coupling (1) is assembled.

6. A variable geometry sealed coupling including two hollow elements (2, 3) each having a respective truncated face (22, 23) which is inclined by an angle with respect to a central axis (23, 33) of each element so that said central axes meet at a single point of intersection (C) at a center of the coupling, sealing and fixing means for coupling the hollow elements (2, 3) together in a sealed relationship with respect to one another while permitting the two hollow elements to be pivoted relative to one another to thereby change an angular relationship therebetween without changing a cross sectional dimension of a flow path through the two hollow elements; the fixing means including on the truncated face (22) of the hollow element (2) a continuation (47) with a circular groove (41) in which is seated a bearing means (42) to create a pivoting connection to a fixing ring (43) which, in an internal part thereof, has a profile that complements that of the continuation, and, on the truncated face (32) of the hollow element (3), a flange (44) with a circular groove (48) in which seats another bearing means (49) which cooperates with the internal part of the ring (43) to couple the two hollow elements (2, 3) together.

7. A variable geometry sealed coupling including two hollow elements (2, 3) each having a respective truncated face (22, 23) which is inclined by an angle with respect to a central axis (23, 33) of each element so that said central axes meet at a single point of intersection (C) at a center of the coupling, sealing and fixing means for coupling the hollow elements (2, 3) together in a sealed relationship with respect to one another while permitting the two hollow elements to be pivoted relative to one another to thereby change an angular relationship therebetween without changing a cross sectional dimension of a flow path through the two hollow elements; the fixing means including, on the truncated face (22) of the hollow element (2), a continuation (47) with a right-hand thread (50) which engages with an internal screw thread (51) of a fixing ring (43), and on the truncated face (32) of the hollow element (3), a flange (44) with a screw thread (53) which engages an internal thread (52) of the fixing ring so that when the ring (43) is screwed on, the two hollow elements (2, 3) move toward one another, locking the coupling, and indexing means on faces of the continuation 47 and flanges 44.

8. A variable geometry sealed coupling including two hollow elements (2, 3) each having a respective truncated face (22, 23) which is inclined by an angle with respect to a central axis (23, 33) of each element so that said central axes meet at a single point of intersection (C) at a center of the coupling, sealing and fixing means for coupling the hollow elements (2, 3) together in a sealed relationship with respect to one another while permitting the two hollow elements to be pivoted relative to one another to thereby change an angular relationship therebetween without changing a cross sectional dimension of a flow path through the two hollow elements, the fixing means including, on the truncated face (22) of the hollow element (2), a continuation (47) with a conically profiled flange (58), on the truncated face (32) of the hollow element (3), another conically profiled flange (59), and a ring (60) made of two semi-collars (61, 62) comprising threaded (63) and plain (64) holes allowing the ring (60) to join the conical flanges (58, 59).

9. A variable geometry sealed coupling including two hollow elements (2, 3) each having a respective truncated face (22, 23) which is inclined by an angle with respect to a central axis (23, 33) of each element so that said central axes meet at a single point of intersection (C) at a center of the coupling, sealing and fixing means for coupling the hollow elements (2, 3) together in a sealed relationship with respect to one another while permitting the two hollow elements to be pivoted relative to one another to thereby change an angular relationship therebetween without changing a cross sectional dimension of a flow path through the two hollow elements, the fixing means including, on the truncated faces (22, 32) of the hollow elements (2, 3), a threaded continuation (66, 67) into which support pieces (68, 69) are introduced, rings (70, 71) which respectively cooperate with threaded continuations (66, 67) to hold the pieces (68, 69), the rings (70, 71) each having a groove (72, 73) which houses an O-ring (74) when the hollow elements (2, 3) are coupled, another ring (75) allowing the rings (70, 71) to be joined together when the hollow elements (2, 3) are coupled, and indexing means on the truncated faces of the hollow elements.

10. The variable geometry sealed coupling according to claim 9, wherein the ring (75) has a tapped thread (76) which cooperates with an external thread (77) of the ring (70) and lateral drillings (78) which open into grooves (79) formed at a periphery of the ring (71).

11. The variable geometry sealed coupling according to claim 10, wherein balls (85) are provided in the grooves (79) to allow a rotary connection to be made between the hollow elements (2, 3).

* * * * *